United States Patent
Felsen

(10) Patent No.: US 6,318,796 B1
(45) Date of Patent: Nov. 20, 2001

(54) VEHICLE FLOOR OF A PASSENGER CAR

(75) Inventor: Hans-Jürgen Felsen, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/630,951

(22) Filed: Aug. 3, 2000

(30) Foreign Application Priority Data

Aug. 5, 1999 (DE) .............................................. 199 36 881

(51) Int. Cl.⁷ .................................................. B62D 25/00
(52) U.S. Cl. ......................................... 296/208; 296/39.3
(58) Field of Search ................... 296/39.3, 208; 454/144, 62

(56) References Cited

U.S. PATENT DOCUMENTS

| | | | |
|---|---|---|---|
| 1,733,759 | * 10/1929 | Snell | 296/208 X |
| 2,696,774 | * 12/1954 | Bayley | 296/208 X |
| 3,455,595 | * 7/1969 | Wessells, III et al. | 296/208 |
| 4,440,434 | * 4/1984 | Celli | 296/208 X |
| 5,052,283 | * 10/1991 | Altus | 454/144 |
| 6,102,465 | * 8/2000 | Nemoto et al. | 296/39.3 |

FOREIGN PATENT DOCUMENTS 0 338 908 B1    4/1989    (EP) .

* cited by examiner

*Primary Examiner*—Joseph D. Pape
(74) *Attorney, Agent, or Firm*—Crowell & Moring LLP

(57) ABSTRACT

The invention relates to a vehicle floor of a passenger car having a base plate, having a soundproofing floor covering applied to the base plate, an air-conditioning duct which extends in the floor covering, a duct outlet which opens into the vehicle rear, and carries conditioned air from an air-conditioning device of the vehicle into the vehicle rear. To reduce the introduction of sound into the vehicle rear through the air-conditioning duct, the invention provides for a sound and vibration decoupler portion extending between the air-conditioning device and the duct outlet.

8 Claims, 1 Drawing Sheet

VEHICLE FLOOR OF A PASSENGER CAR

FIELD OF INVENTION

The invention relates to a vehicle floor of a passenger car, and more specifically to a sound proofing vehicle floor

BACKGROUND OF INVENTION

A vehicle floor of a passenger car generally has a base plate, to which a soundproofing floor covering is applied. In more luxurious passenger cars, an air-conditioning duct is laid in this floor covering, the duct having a duct outlet which opens into the vehicle rear and serving to carry conditioned air from an air-conditioning device of the vehicle into the vehicle rear.

However, such an air-conditioning duct also allows sound to enter the rear area of the vehicle interior, the sound entering in the region of air-inlet openings to the air-conditioning device, for example, or being produced in the air-conditioning device itself, e.g. by a fan motor. To reduce this rise in the noise level in the vehicle interior caused by the air-conditioning duct, EP 0 338 908 B1 discloses the provision of a soundproofing layer of foam on both the inside and the outside of a rigid-plastic core of the air-conditioning duct.

SUMMARY

The present invention specifies an apparatus in which sound transmission into the vehicle interior through the air-conditioning duct is reduced.

The invention forms in the air-conditioning duct a duct portion which decouples adjoining portions of the air-conditioning duct, in particular the duct outlet and the portion of the air-conditioning duct connected to the air-conditioning device. These adjoining portions are decoupled with respect to the transmission of vibrations. For this purpose, the proposal is to construct this duct portion exclusively of a sound- and vibration-absorbing material. The invention makes use of the insight that, in the case of a conventional air-conditioning duct, not only air-borne noise but also structure-borne noise is transmitted. On the one hand, this transmission of structure-borne noise takes place from the air-conditioning device, via the air-conditioning duct, to the duct outlet, from where the noise propagates to an upper layer of the floor covering, the said upper layer generally being of tread-resistant design, and excites this upper layer to vibrate and thus emit noise. On the other hand, a conventional air-conditioning duct forms a bridge for structure-borne noise between the base plate and the tread-resistant upper layer of the floor covering, the bridge allowing the structure-borne noise introduced into the floor covering or produced in it to bypass a soundproofing insulating layer of the floor covering arranged between the base plate and the upper layer and to be transmitted to the tread-resistant upper layer of the floor covering. The design proposed in accordance with the invention of the duct portion with a sound-absorbing and vibration-absorbing effect eliminates or reduces both structure-borne noise coupling between the air-conditioning device and the duct outlet or tread-resistant floor-covering layer and structure-borne noise coupling between the base plate and the tread-resistant floor-covering layer.

According to one embodiment, the vehicle floor air-conditioning duct portion that is composed of the sound- and vibration-absorbing material, can be formed by an aperture in the floor covering or its insulating layer arranged between the tread-resistant upper layer and the base plate, since, in the case of a soundproofing floor covering, the insulating layer generally also has the required property of sound and vibration absorption. An embodiment of this kind makes it possible to save on materials, an advantage in large-volume manufacture.

It is evident that the reduction in sound transmission by the air-conditioning duct achieved by means of the invention is proportionally better, the larger the air-conditioning duct portion configured in accordance with the invention. This absorbing air-conditioning duct portion preferably extends between two seat crossmembers which support a front seat of the vehicle.

Further important features and advantages of the vehicle floor according to the invention will become apparent from the claims, the drawings and the associated description of the figures with reference to the drawings.

It is self-evident that the features mentioned above and those which remain to be explained can be used not only in the respectively stated combination but also in other combinations or alone without departing from the scope of the present invention.

Exemplary embodiments of the invention are illustrated in the drawings and are explained in greater detail in the description which follows.

DESCRIPTION OF EMBODIMENTS

Figure 1:
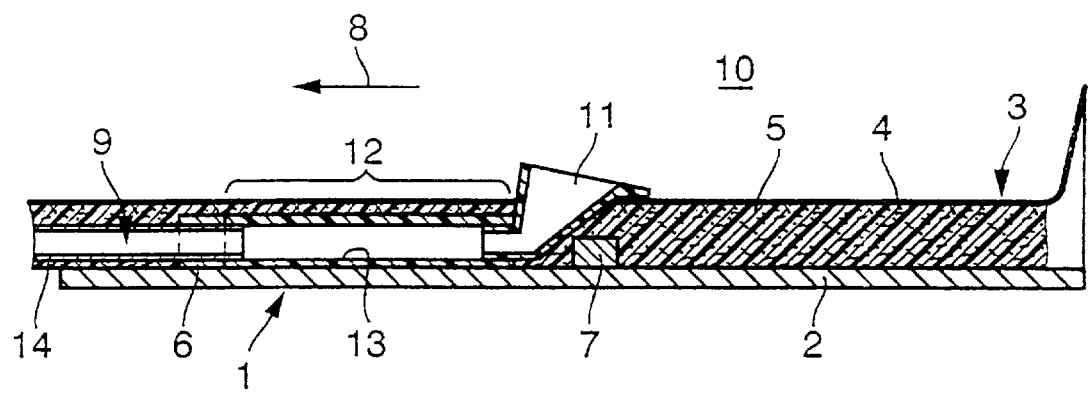
FIG. 1 illustrates one embodiment of a longitudinal section through part of a vehicle floor.
Figure 2:
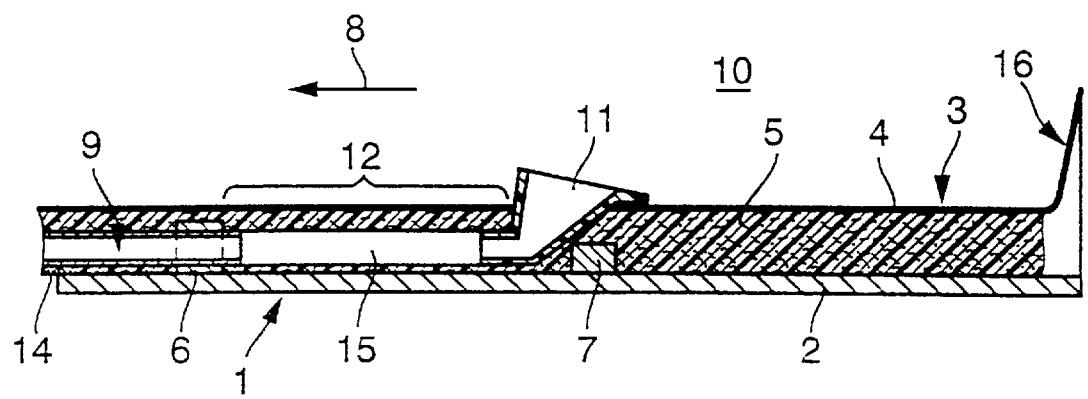
FIG. 2 illustrates one embodiment of a longitudinal section through part of a vehicle floor.

FIGS. 1 and 2 illustrate embodiments of a vehicle floor in which a vehicle floor 1 comprises a base plate 2 which enables passengers to step into or stand in the vehicle interior. This base plate 2 is generally formed by a steel or aluminium sheet. A soundproofing floor covering 3 is applied to the base plate 2, this floor covering having a tread-resistant upper layer 4 designed in the manner of a carpet on its upper side, which faces the interior, and an insulating layer 5, which is arranged between this upper layer 4 and the base plate 2.

Extending within the vehicle floor 1 are two seat crossmembers, namely a front seat crossmember 6 and a rear seat crossmember 7, both of which are used for attaching and supporting a front seat (not shown) of the vehicle. Extending within the floor covering 3 or within the insulating layer 5 in a portion of the vehicle floor 1 is an air-conditioning duct 9 which introduces conditioned, e.g. heated or dried, air into a rear area 10 of the vehicle interior from an air-conditioning device (not shown) located in the front area of the vehicle. For this purpose, the air-conditioning duct 9 has an outlet part or duct outlet 11, via which the conditioned air enters the footwell of the vehicle rear 10.

Between the seat crossmembers 6 and 7, the air-conditioning duct 9 has a sound and vibration decoupler portion 12 which, according to the invention, is composed exclusively of a sound- and vibration-absorbing material, e.g. of an open-cell foam, open-cell foam that is internally lined, soft open-cell foam, and soft open-cell adhesive foam.

FIG. 1 illustrates one embodiment of a vehicle floor having an air-conditioning duct 9 with a sound and vibration decoupler portion 12. In this embodiment, sound and vibration decoupler portion 12 is formed by a duct body 13 manufactured from the said sound- and vibration-absorbing material. In this arrangement, this duct body 13 connects the duct outlet 11 to a connection to the air-conditioning device or a duct portion 14 produced in a conventional manner and leading to the air-conditioning device.

FIG. 2 illustrates an embodiment of a vehicle floor having an air-conditioning duct 9 with a sound and vibration decoupler portion 12. In this embodiment, sound and vibration decoupler portion 12 is formed by an aperture 15 which is formed in the insulating layer 5 of the floor covering 3 and into which the connection to the air-conditioning device or duct portion 14 opens on the upstream side and the duct outlet 11 opens on the downstream side. The insulating layer 5 of this embodiment is composed of an appropriate sound- and vibration-absorbing material.

Each embodiment brings about decoupling of structure-borne noise in the region of the duct body 13 and the opening or aperture 15 respectively. Here, transmission of structure-borne noise from the conventionally designed duct portion 14 to the duct outlet 11, and from the duct outlet 11 to the tread-resistant upper layer 4 of the floor covering 3, and from the base plate 2 to the tread-resistant upper layer 4 of the floor covering 3, is reduced thereby lowering the noise level in the vehicle interior.

Since the introduction of sound via the air-conditioning duct 9 into the vehicle interior occurs in a significant amount through or via the duct outlet 11, decoupling a portion of the air-conditioning duct 9 upstream from duct outlet 11 provides significant reduction of sound through the duct outlet 11. In the embodiments shown, decoupling an area which extends between the seat crossmembers 6 and 7 of the front seat provides this result.

To prevent moisture from penetrating into the insulating layer 5, the inside of the air-conditioning duct 9 is lined, in particular duct body 13 and opening or aperture 15 of the duct portion 12.

The insulating layer 5 ends in the region of the rear seats 16.

Although the invention has been described in detail with reference to certain preferred embodiments and specific examples, variations and modification exist within the scope and spirit of the invention as described and as defined in the following claims.

What is claimed is:

1. A vehicle floor comprising:

a base plate;

a soundproof floor covering over the base plate; and an air duct carrying conditioned air from an air conditioning device through a portion of the soundproof floor covering to an outlet, the air duct including an elongated sound and vibration decoupler portion, the sound and vibration decoupler portion composed of a sound and vibration absorbing material.

2. The vehicle floor of claim 1, wherein the sound and vibration absorbing material is an open-cell foam.

3. The vehicle floor of claim 1, wherein the sound and vibration absorbing material is an open-cell foam that is internally lined.

4. The vehicle floor of claim 2, wherein the sound and vibration absorbing material is a soft open-cell foam.

5. The vehicle floor of claim 4, wherein the sound and vibration absorbing material is a soft open-cell adhesive foam.

6. The vehicle floor of claim 1, wherein the sound and vibration decoupler portion is formed by a portion of the soundproof floor covering having an aperture, at least the portion of the soundproof flooring having the aperture being composed of the sound and vibration absorbing material.

7. The vehicle floor of claim 1, wherein at least a portion of the air duct is composed of the sound and vibration absorbing material.

8. The vehicle floor of claim 1, wherein the sound and vibration decoupler portion extends between two seat cross members which support a vehicle front seat.

* * * * *